Patented Apr. 9, 1935

1,996,801

UNITED STATES PATENT OFFICE 1,996,801

PREPARATION OF EGG PRODUCTS

Norman C. Fischer, Chicago, Ill., assignor to Armour and Company, Chicago, Ill., a corporation of Illinois No Drawing. Application January 24, 1934, Serial No. 708,076

6 Claims. (Cl. 99—5)

The present invention relates to the production of egg products, and has particular reference to improvements in the processing of egg whites for the purpose of producing dried or desiccated egg products which may be conveniently stored and shipped in dried form, and subsequently reconstituted by the user to reacquire the characteristics of undried whites with respect to foam formation and the like.

A particular object of the invention is to provide an improved process for drying egg whites.

An additional object is to provide a process by which egg whites may be dried in a relatively short period of time after treatment has begun and a product produced which will have superior characteristics to the dried egg white products known heretofore.

A still further object is the provision of a process for drying egg whites by which standard procedures may be determined upon and plant operation regulated in a definite order of procedure.

These and other objects will be understood upon consideration of the following description of my invention.

When an attempt is made to dry egg whites in their natural condition, there results a stringy unsatisfactory product which is objectionable from many standpoints. For this reason the standard method of drying eggs heretofore has been to subject the eggs to extended bacterial action which has the effect of conditioning the eggs so that they may be dried to produce a product which may be reconstituted. The preliminary treatment of the egg whites with bacteria is generally known as "ripening", and consists principally in maintaining the whites under a condition favorable for bacterial growth for a period which may be from three to ten days. Sometimes the natural bacteria content of the whites is augmented by addition of a suitable culture.

Due to the uncertainties of the bacterial action or fermentation the drying of egg whites was always a haphazard process. The fermentation could not always be controlled as desired, due to the fact that the bacteria used were never in pure culture. If an effort was made to use pure cultures, the predicted results were modified by contamination of the pure cultures with various types of organisms contained in the whites themselves, and quite often the product had a bad odor. Also due to the different rates of growth of the organisms it was not possible to foretell with certainty when the egg whites would be in a condition for drying. For example, when the product was spray-dried, it was customary to take samples at the start of the day's run and spray-dry such samples to determine if the batch was in a condition for drying. This uncertainty resulted in increasing the cost of the drying process greatly. As an example, the boilers of the drying plant must be brought up to pressure and a full gang of men employed at the time each test is made, since, if the batch is ready to be run, immediate drying is in order. Otherwise, the fermentation process will proceed to putrefaction.

In producing egg products of various types it has been suggested to add thereto various chemicals, such as sodium chloride or table salt and carbohydrates. For the production of emulsifying agents from egg yolks and whites, Epstein Patent No. 1,737,365, issued November 26, 1929, refers to treatment of the eggs with sodium chloride, glycerin, sucrose, dextrose, and acids such as citric acid, lactic acid, tartaric acid and their equivalents, attention being called in the patent to the detrimental action of the acid on the egg material. It also has been sugested to use small quantities of materials such as lemon juice and the like, as a preservative of desiccated egg whites which have been subjected to the usual bacterial fermentation or ripening prior to drying.

In accordance with my invention I have provided a process by which egg whites may be dried in a small fraction of the time required heretofore to accomplish this result, and whereby a product is obtained which is considerably better than the products known heretofore. The invention is based upon my discovery that egg whites may be satisfactorily dried without bacterial fermentation by first subjecting them to the action of a suitable acid which has the property of hydrolyzing or liquefying the egg whites, and that the product which results from drying the acid-treated egg whites is in fact superior to that obtained by drying the usual fermented egg whites, with respect to such characteristics as foam formation, beating qualities and lifting power.

It will be recognized that the acid which is to be used in the process must be selected with considerable care and that many of the known acids will be unsuitable for the process due to their toxic effect or undesirable action upon the egg material. In general, inorganic acids which I have found to be effective for the preliminary hydrolysis of the whites are hydrochloric acid, sulphurous acid, sulphuric acid and phosphoric acid, while suitable organic acids are lactic acid, citric acid, malonic acid and malic acid. Acids such as oxalic and arsenic cannot be employed due to their toxic effect. Similarly, iodic and formic acids cannot be employed. In general, the characteristics of the various acids are sufficiently well known to enable one practicing the invention to recognize whether or not any particular acid could be employed in the process. Obviously, some acids will work more satisfactory than others.

In the operation of the acid process, the egg whites are placed in a suitable vat and without the necessity of bacterial fermentation are treated directly with a sufficient quantity of a suitable acid to liquefy or hydrolyze the egg whites in a relatively short period of time, it being understood that the egg whites and the acid are agitated together during the treatment in order to effect an even and complete action. Apparently, the action of the acid is catalytic, and after the hydrolysis of the egg whites is complete it will be found that the whites have a free acidity which approximates the amount of acid added to the vat. After the hydrolysis is complete the whites are immediately subjected to a drying action which will reduce the moisture content of the product to the desired extent, the acidity of the whites being reduced preferably before the drying process is complete.

As an example of my process, I may place in a suitable vat about 15,000 pounds of fresh egg whites and bring their temperature to about 80° F. To this vat is added, with constant agitation, approximately 4 per cent of one-tenth normal sulphuric acid. The acid used in my process is diluted sufficiently with water to prevent local coagulation of the egg whites as the acid is added thereto. Agitation during the time of adding the acid to the whites also helps to prevent any local action of this type. The acidulated mass of egg whites is stirred thoroughly for approximately thirty minutes after addition of the acid, and at the end of this period it will be found that the viscosity of the whites has been reduced to substantially that of water.

I have found that the sulphuric acid while in a mixture with the undried whites has no detrimental action thereon, but if the acid is allowed to remain in the whites to the completion of the drying process, then the whites are affected deleteriously. Probably this objectionable action is due to a charring of the organic materials of the egg whites. For this reason I reduce the pH of the egg whites prior to completion of the drying action and preferably before the drying process is commenced. The reduction of pH may be effected by neutralization with sodium hydroxide whereby there is produced in the final product a small quantity of sodium sulphate.

It will be understood that by proper selection of the acid which is employed in the hydrolyzation process and the alkaline material which is selected for the neutralization, the salt which remains in the egg product subsequent to neutralization may have different acid and basic radicals than does sodium sulphate. For instance, hydrochloric acid may be used in the hydrolyzation of the egg whites and sodium hydroxide used in the neutralization, whereby to obtain sodium chloride or table salt in the final product. Corresponding organic salts may be formed by employing acids such as citric and lactic for the hydrolyzation.

To condition egg whites by bacteriological fermentation to a comparable state with the acid-treated whites would require several days' action of the bacteria under favorable conditions.

Where approximately 4 per cent of a tenth normal acid is added to the egg whites for hydrolysis, the liquid whites will have an acidity of approximately 0.3 per cent when calculated as lactic acid, the pH of the egg whites being around 5.2. The acidity will vary to some extent due to variation in the buffering action of the egg whites in different batches.

After hydrolysis or liquefaction, the whites may be subjected immediately to drying by a spray-drying process or in pans, in either of which cases the drying process results in reduction of the moisture content of the whites to the desired extent.

The resultant product does not have an objectionable odor and may be reconstituted by the consumer to substantially the same state as fresh whites, with respect to such characteristics as foam formation, beating qualities, lifting power and general utility as where fresh whites may be used. The acidity of the product will depend upon the degree to which the pH is reduced. Ordinarily, it will be desirable to reduce the pH of the product to approximately 7.0, although, particularly where organic acids such as citric and lactic are employed, the product may be left in an acid condition. In general, it is better to substantially completely neutralize the whites where inorganic acids are employed.

It is a characteristic of my process that it may be controlled in a highly satisfactory manner with respect to plant operation as well as the product contained. That is, it is possible to produce a product of standard quality as to the important characteristics of dried egg whites and, at the same time, plant operations may be carried on in a concise and regular manner. Due to the short length of time required to process the eggs prior to drying, it is possible to greatly increase the output of egg drying equipment at a considerably decreased cost in labor, fuel, and the like.

A particular advantage of the process is that a sweet smelling product is obtained as compared with the old method of drying eggs wherein it was not possible to predict the odor of the final product, due to the long period of time in which the odor-producing types of bacteria had an opportunity to develop.

In accordance with my process the time for drying the product can be accurately estimated, so that it is not necessary to maintain the drying equipment in the condition for operation until the egg whites are hydrolyzed and ready to be dried.

When tested for lifting or beating power by weighing an amount of dried egg powder, adding this to a definite quantity of water, and whipping for three minutes under standard conditions of beater speed and temperature, the amount of fluff formed from eggs dried in accordance with this process is equal to or greater than a similar quantity of egg whites which have not been dried. By establishing a definite procedure for plant operation it is possible to always obtain a standard product having definite characteristics.

While the process is of advantage in treating egg whites which have been separated from the yolk of an egg, it also may be used for drying eggs which have not been completely separated from the yolk, as in the case of whole eggs, particularly in that the yolk which is present during the hydrolysis and drying is not afforded an opportunity for bacterial breakdown to form off-odor break-down products.

Considerable difficulty has been encountered heretofore in producing dried whole eggs in which the albumin was substantially completely soluble and the product was sufficiently dry to inhibit bacterial action, and of a pleasant odor. The product obtained in accordance with my process will be desirable from all of these standpoints.

The process is susceptible of many changes without departing from the invention. The type of neutralization or reduction of pH will depend upon such factors as the particular acid employed. For example, the hydrochloric and sulphurous acids are sufficiently volatile to be evaporated during the drying process, wherefore it is not necessary to add an alkaline material for neutralization or reduction of the pH, the use of volatile acid being described and claimed in my copending application, Serial No. 708,053.

The physical conditions of the process and the amount of acid employed are not necessarily limited as in the specific example given. The time required for hydrolyzing or liquefying the egg whites will depend upon such factors as the temperature at which the process is carried out and the amount of acid employed. In any case it will be found that the process may be controlled so as to establish a standard plant practice whereby uniform results may be obtained at all times and a standard product of unusual purity and desirable characteristics obtained. The amount of time consumed in the process is reduced from several days, as under former practice, to the most a few hours. It has been my discovery that the whites liquefied by this direct acid hydrolysis, when dried, result in a product of improved quality from the standpoint of reconstitution as well as palatability. The absence of flavors and odors indicative of the presence of unfavorable fermentation has proved of great value in marketing the product.

The physical characteristics of the dried whites will depend somewhat on the method employed in the drying process. Whites which have been spray-dried tend to partake of a powder-like form, while whites which are dried in a quiescent state tend to be of a flaky nature.

All of the various embodiments suggested herein and others which will occur to one skilled in the art are intended to be included in the appended claims.

I claim:

1. A process for drying viscous egg whites for reconstitutional purposes, which comprises subjecting the viscous egg whites to treatment with a sufficient quantity of an acid and for a sufficient time to reduce the viscosity of the whites to the extent necessary for drying purposes in a relatively short period of time, subjecting the egg whites to a drying process, and reducing the acidity of the egg whites prior to completion of the drying process, at least to the extent necessary to prevent a deleterious effect upon the dried product.

2. A process for drying viscous egg whites for reconstitutional purposes, which comprises subjecting the viscous egg whites to treatment with a sufficient quantity of an acid and for a sufficient time to substantially reduce the viscosity of the whites in a relatively short period of time, neutralizing the egg whites, and subjecting the neutralized egg whites to a drying process for removing the desired amount of moisture therefrom.

3. A process for drying viscous egg whites for reconstitutional purposes without producing a deleterious effect upon the dried egg whites, which comprises subjecting the viscous egg whites to treatment with an acid from the group consisting of sulphuric acid, sulphurous acid, phosphoric acid, lactic acid, citric acid, malonic acid and malic acid, said treatment being carried out with a sufficiently large quantity of acid to reduce the viscosity of the egg whites to substantially that of water in a relatively short period of time, subjecting said egg whites to a neutralization step and subjecting the egg whites to drying to remove the desired percentage of moisture therefrom.

4. A process for drying viscous egg whites for reconstitutional purposes, which comprises subjecting the viscous egg whites to treatment with an acid from the group consisting of sulphuric acid, sulphurous acid, phosphoric acid, lactic acid, citric acid, malonic acid and malic acid, said treatment being carried out with a sufficiently large quantity of the acid to render the egg whites acid and to reduce the viscosity of the egg whites in a relatively short period of time to the extent necessary for drying purposes, subjecting the egg whites to drying to remove the desired percentage of moisture therefrom, and reducing the acidity of the egg whites prior to completion of the drying process, so that substantially no deleterious effect upon the dried product is produced.

5. A process for drying viscous egg whites for reconstitutional purposes, which comprises subjecting the viscous egg whites to treatment with an acid from the group consisting of sulphuric acid, sulphurous acid, phosphoric acid, lactic acid, citric acid, malonic acid and malic acid, said treatment being carried out with a sufficiently large quantity of the acid to render the egg whites acid and to reduce the viscosity of the egg whites in a relatively short period of time to an extent sufficient for drying purposes, subjecting the egg whites to drying to remove the desired percentage of moisture therefrom, and reducing the acidity of the egg whites prior to completion of the drying process by adding an alkaline material to said egg whites prior to completion of the drying process.

6. A process for drying viscous egg whites, which comprises subjecting a quantity of said egg whites to treatment with a sufficient amount of lactic acid to reduce the viscosity of the egg whites to the extent necessary for drying purposes, said amount being insufficient to produce a deleterious effect on the final product, and then subjecting the egg whites to a drying step to produce an acid product which may be reconstituted.

NORMAN C. FISCHER.